Oct. 13, 1942.
G. E. GRAY
2,298,735
ELECTRIC MOTOR
Filed May 4, 1940
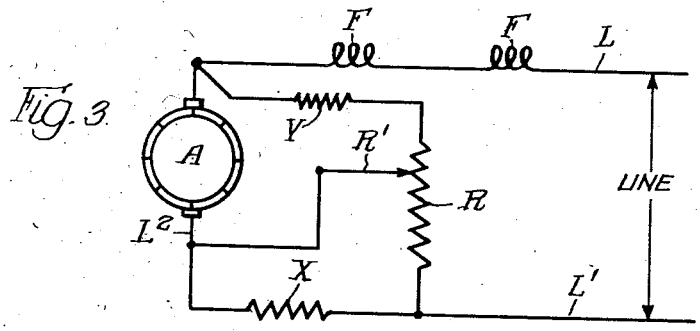
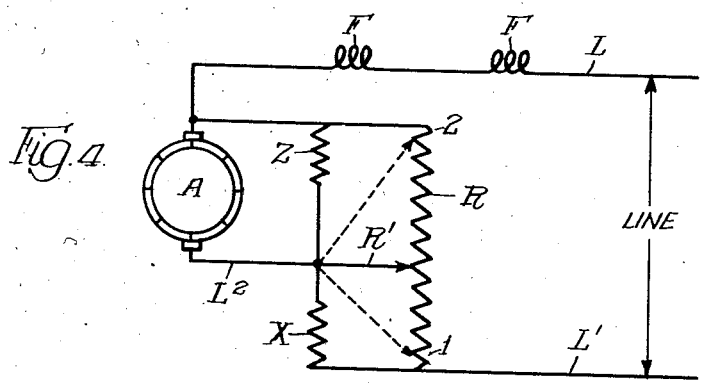
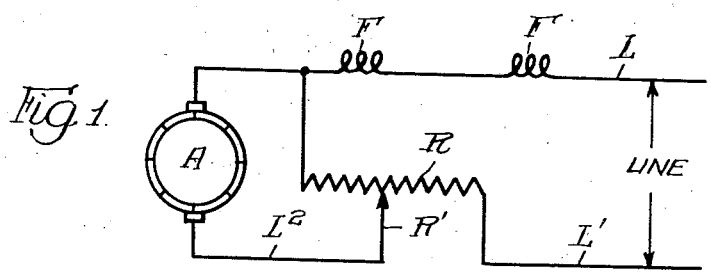
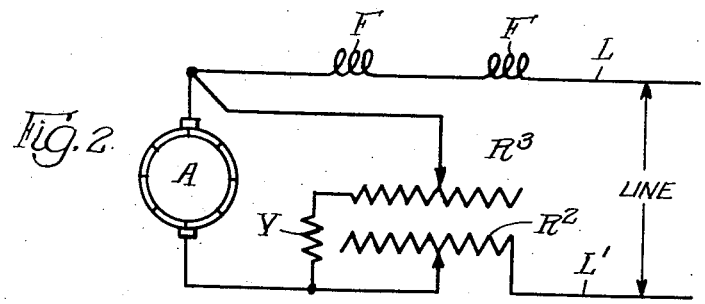
INVENTOR.
Gordon E. Gray, Patented Oct. 13, 1942

2,298,735

UNITED STATES PATENT OFFICE 2,298,735

ELECTRIC MOTOR

Gordon E. Gray, Western Springs, Ill., assignor to David T. Siegel, Wheaton, Ill.

Application May 4, 1940, Serial No. 333,308

8 Claims. (Cl. 172—239)

My invention relates to universal or series wound motors and has for its object to obtain such a motor which will have a wide range of minimum and maximum speed and will maintain at least an approximate constant torque throughout that range of speed.

Heretofore, numerous attempts have been made to achieve the above object and these have preceeded primarily along two different lines of endeavor, namely:

1. The provision of a single variable resistance shunted across the two lines or leads of the power supply to the motor, a variable contact arm for said variable resistance being connected to one of the armature terminals, whereby to provide a shunt across the armature which can be employed as a means for simultaneously varying the series and armature voltages.

This arrangement, however, suffers from the disadvantage that the provision of sufficient resistance across the armature in the high speed position—to keep the speed of the motor as near its maximum as possible—results in two much resistance being placed in series at the low speed setting.

2. The second course of procedure has heretofore been predicated upon the inclusion of a variable resistance in series with the power supply line and a second variable resistance shunted across the armature of the motor, the series variable resistance having been proportioned with respect to the armature variable resistance in such a way that the line current and hence the field strength can be maintained to any desired value or kept constant throughout the entire range of speed of which the motor is capable. In some cases, such an arrangement has included an armature limiting resistance in the shunt across the armature.

An object of the present invention is to overcome the disadvantage of the prior arrangement specified under (1) above and further to avoid the relatively complex structure of the arrangement described under (2) above whilst retaining the advantages thereof. In other words, in the latter case, to dispense with the employment of one of said two variable resistances and thereby eliminate the resulting complex mechanical arrangement.

To this end, briefly stated, the present invention consists, on the one hand, in the addition to the arrangement described under (1) above, of a fixed resistance in series with one side of the power line, and which resistance, on the other hand, is substituted for the series variable resistance of the prior arrangement described under (2) above, thereby considerably simplifying said structure.

In the drawing:

Figs. 1 and 2 are circuit diagrams of the prior arrangements described under (1) and (2) above and which are included herein for the purpose of comparison;

Fig. 3 is a similar view of an arrangement according to the present invention; and, Fig. 4 is a circuit diagram of a modified arrangement according to the invention.

In Figs. 1 and 3, A indicates the armature of the motor, F the field coils disposed in series in the line or lead L of the external circuit, the other line or lead of which is denoted by the reference $L^1$. Shunted across the lines L and $L^1$ is a variable resistance R, a variable or movable contact arm $R^1$ for which is connected to the lead $L^2$ through the variable resistance R and arm $R^1$ thus forming a continuation of the lead $L^1$.

A comparison of Figs. 1 and 3 will immediately show that the improvement according to the present invention consists in the inclusion between the lines $L^1$ and $L^2$ of a fixed series resistance X. In other words, this fixed resistance X is connected at one end to that armature terminal to which the variable contact arm $R^1$ is connected, the other end of said resistance being connected to that end of the line $L^1$ to which one end of the variable resistance R is connected.

The employment of the fixed resistance X permits the resistance placed across the armature to be of any desired value up to infinity which results in the maximum speed of the motor and yet at the same time it limits the total amount of resistance in series in the lower speed positions and this by reason of the fact that the total series resistance equals the resultant resistance of the parallel combination of the said fixed resistance and the amount of armature resistance chosen, that is to say, which is allowed to remain in the series circuit in parallel with the fixed resistance.

In the high speed position; that is, when the variable resistance R is cut out of the series circuit, the fixed resistance X will be shorted out and there will then be no resistance in series with the motor, the path being through the lead $L^1$, the movable arm $R^1$ and lead $L^2$ to the connected armature terminal.

Referring now to the prior arrangement of Fig. 2, it has been found that the use of two correctly proportioned variable resistances R² and R³ will give excellent speed control of universal or series wound motors.

The present control circuit shown in Fig. 3 and as hereinbefore described will electrically accomplish approximately the same control as the prior dual variable resistance arrangement with the use of but one variable resistance only with the addition of the fixed resistance X.

When employing the prior tandem variable resistance arrangement experience has shown that the amount of resistance added in series to maintain a constant line current is only one-fifth (⅕) to one-tenth (1/10) the reduction in resistance in the shunt variable resistance R³. In other words, the shunt variable resistance R³ will have from five to ten times as much resistance as the series variable resistance. In the Fig. 3 arrangement if the fixed resistance X were omitted, it will be seen that the amount of resistance placed in series with the line will be equivalent to the reduction in resistance across the armature circuit. The introduction, according to the present invention, of a fixed resistance X in parallel with all of the resistance of the variable resistance and of such a value that the equivalent value of the series variable resistance R² of Fig. 2 will be provided will assure the necessary ratio between series resistance and shunt resistance above set forth without the necessity of incorporating a second variable resistance in the hook-up.

It should be pointed out that in the middle portion of the variable resistance of the present arrangement there may be a little more series resistance than is required which will tend to produce a slight reduction in torque but not sufficient to really interfere with the smooth working of the motor in the medium speed position.

If found necessary or desirable, arrangements can be made to leave a small amount of fixed resistance in the armature circuit at the slow speed position of the present arrangement. This can readily be taken care of for example by introducing an armature limit resistance Y into the shunt circuit as shown or the variable resistance R could be provided with an internal stop so that the desired resistance would always be left in at the shunt end portion of the variable resistance. As a matter of fact, by the provision of a further stop and tap, the fixed resistance X could also be included in the same winding as that which constitutes the variable resistance R as will be readily understood by anyone skilled in the art.

Fig. 4 shows a modification of the present invention from which it will be seen that a fixed resistance Z is connected across the armature shunt circuit.

This modification permits the resistance in the armature circuit to be varied from zero to a given maximum whilst at the same time the resistance in the series circuit can be varied from an entirely different maximum resistance to zero, the value of the variable resistance R being independent of the circuit requirements other than that for the given maximum armature circuit resistance desired, the parallel combination of the variable resistance R and resistance Z shall be the required resistance in the armature circuit when the variable contact is in position 1. At the position 2 this value of the variable resistance R in parallel with the resistance X shall equal the required maximum value of resistance in the series circuit.

In the Figure 4 arrangement if preferred the fixed resistances X and Y may be incorporated in or form a continuation or part of the winding of the variable resistance R, suitable stops and taps being provided to properly position them in their respective circuits.

With the arrangements according to the present invention hereinbefore described it is to be appreciated that the relationship between the series and shunt resistances may be varied in practically any desired ratio. For example, on the one hand, the shunt resistance may be varied from between zero and infinity while varying the series resistance between narrow limits, whilst on the other hand, the series resistance may be varied from zero to infinity while varying the shunt resistance through a comparatively narrow range, as may possibly be found desirable in exceptional cases.

It has hereinbefore been stated that the resistances X of Figures 3 and 4 respectively and the resistance Y of Figure 4 are fixed resistances. This is not to be understood, however, to mean that these resistances cannot be provided with a variable factor which will permit of their initial or even of their subsequent adjustment. Such a factor is essential, or at least desirable, in order that the ratios of the various resistances employed in any particular motor may be given that fine adjustment which will best fit it initially for the particular load or job which it is selected to handle and further in order to provide, during service, adjustments which may be found necessary or desirable to maintain it at maximum efficiency.

It is to be understood that instead of resistance employed as hereinbefore described, impedance may be utilized with equivalent results and therefore, the scope of the appended claims is to be interpreted accordingly.

Further, and finally, it will be noted that in the foregoing description and in the drawing, the field coils F are shown as being in series in one and the same line L of the series circuit; the present invention is equally applicable to the case where one of the field coils is disposed in each of the two lines of said circuit, namely, in the lines L and L' respectively.

I claim:

1. The combination with a motor of the series commutative type having a field winding, an armature and brushes, a source of current, said source of current having a circuit connection leading to the field winding of said motor and another circuit connection connected to the armature of said motor, said last named connection including parallel paths, one of said paths having a variable resistance therein, and the other of said parallel paths having a fixed resistance therein, and said variable resistance also being connected to that brush of the armature of said motor which is not connected to the source of current through the said parallel paths.

2. An electric motor of the series commutative type having a field winding and brushes, means adapted to connect a source of current to said motor, two fixed resistances, a potentiometer type of variable resistance, means for connecting one of said fixed resistances to one of said brushes in series with one of the source conductors, means for connecting the other fixed resistance to the other brush, means for connecting the other ends of each of said fixed resistances to the outside connections of the said variable resistance, and means for connecting the variable element of the variable resistance to the one of said brushes connected to the first mentioned fixed resistance.

3. The combination with a motor of the series commutative type having a field winding, an armature and brushes, a source of current, said source of current having a circuit connection leading to the field winding of said motor and another circuit connection connected to the armature of said motor, said last named connection including parallel paths, one of said paths having a variable resistance therein, and the other of said parallel paths having a fixed resistance therein, and a further path which includes a second fixed resistance therein connecting said variable resistance path to said field winding circuit connection.

4. The combination with a motor of the series commutative type having a field winding, an armature and brushes, a source of current, said source of current having a circuit connection leading to the field winding of said motor and another circuit connection connected to the armature of said motor, said last named connection including parallel paths, one of said paths having a potentiometer type of variable resistance therein, and the other of said parallel paths having a fixed resistance therein, and a circuit connection for connecting said variable resistance path directly to said field winding circuit connection.

5. The combination with a motor of the series commutative type having a field winding, an armature and brushes, a source of current, said source of current having a circuit connection leading to the field winding of said motor and another circuit connection connected to the armature of said motor, said last named connection including parallel paths, one of said paths having a variable resistance therein, and the other of said parallel paths having a fixed resistance therein and a circuit connection for connecting said variable resistance path directly to said field winding circuit connection, said variable resistance including a contact arm for varying the amount of variable resistance, whereby all of said fixed resistance may be cut out of said other motor circuit connection.

6. An electric motor of the series commutative type having a field winding and brushes, means adapted to connect a source of current to said motor, two fixed resistances, a potentiometer type of variable resistance, means for connecting one end of one of said fixed resistances to one of said brushes in series with one of the source conductors, means for connecting one end of the other fixed resistance to the same brush and the other end to the other brush, means for connecting the other end of said one fixed resistance and the said other end of said other fixed resistance to the outside connection of the said variable resistance, and means for connecting the variable element of the variable resistance to the one of said brushes connected to the first mentioned fixed resistance.

7. An electric motor of the series commutative type having a field winding and brushes, means adapted to connect a source of current to said motor, two fixed resistances, a variable resistance of the potentiometer type, means for connecting one of said fixed resistances to one of said brushes in series with one of the source conductors, means for connecting the other fixed resistance to the other brush, means for connecting the other end of each of said fixed resistances to the outside connection of the said variable resistance, and means for connecting the variable resistance to the one of said brushes connected to the first mentioned fixed resistance.

8. An electric motor of the series commutative type having a field winding and brushes, means adapted to connect a source of current to said motor, two fixed resistances, a variable resistance having a movable arm, means for connecting one of said fixed resistances to one of said brushes in series with one of the source conductors, means for connecting the other fixed resistance to the other brush, means for connecting that end of each fixed resistance that is not connected with said brushes to the outside connection of the said variable resistance, and means for connecting the movable arm of the variable resistance to the one of said brushes connected to the first mentioned fixed resistance.

GORDON E. GRAY.